(12) United States Patent
Döbler et al.

(10) Patent No.: US 6,737,457 B2
(45) Date of Patent: May 18, 2004

(54) USE OF ZWITTERIONIC COMPOUNDS AS MOLD RELEASE AGENTS IN THERMOPLASTICS

(75) Inventors: Martin Döbler, Düsseldorf (DE); Walter Köhler, Duisburg (DE); Siegfried Neumann, Tönisvorst (DE); Wolfgang Ebert, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/096,561

(22) Filed: Mar. 13, 2002

(65) Prior Publication Data

US 2002/0173567 A1 Nov. 21, 2002

(30) Foreign Application Priority Data

Mar. 19, 2001 (DE) .......................................... 101 13 168

(51) Int. Cl.$^7$ ............................ C08L 69/00; C08K 5/41
(52) U.S. Cl. ....................... 524/157; 524/123; 524/130; 524/154; 524/238
(58) Field of Search ............................... 524/123, 130, 524/154, 157, 238

(56) References Cited

U.S. PATENT DOCUMENTS

| 3,751,519 | A |   | 8/1973 | Bostick et al. ............ 260/824 |
|---|---|---|---|---|
| 3,894,077 | A |   | 7/1975 | Horikawa et al. ..... 260/501.12 |
| 4,097,435 | A |   | 6/1978 | Rawlings et al. ......... 260/28 R |
| 4,390,651 | A |   | 6/1983 | Brown, Jr. .................. 524/267 |
| 4,415,696 | A |   | 11/1983 | Mark ......................... 524/490 |
| 4,425,458 | A |   | 1/1984 | Lindner et al. ............. 524/314 |
| 4,446,268 | A |   | 5/1984 | Lee ............................. 524/315 |
| 4,536,590 | A |   | 8/1985 | Brown, Jr. .................. 556/453 |
| 4,626,566 | A |   | 12/1986 | Miller et al. ................ 524/490 |
| 4,927,911 | A |   | 5/1990 | Stewart ...................... 528/371 |
| 5,001,180 | A |   | 3/1991 | Lundy et al. ............... 524/314 |
| 5,210,124 | A |   | 5/1993 | Hovatter et al. ............ 524/311 |
| 5,403,878 | A |   | 4/1995 | Ishiwa et al. ............... 524/158 |
| 5,494,952 | A | * | 2/1996 | Hirata |
| 5,744,626 | A |   | 4/1998 | O'Lenick, Jr. ............. 554/227 |
| 5,824,737 | A | * | 10/1998 | Antonietti |
| 5,852,114 | A | * | 12/1998 | Loomis |

FOREIGN PATENT DOCUMENTS

| DE | 3312158 | 10/1983 |
|---|---|---|
| EP | 0 100 918 | 2/1984 |
| EP | 0 352 458 | 1/1990 |
| JP | 42026523 | * 12/1967 |
| JP | 62-109854 | 5/1987 |

* cited by examiner

*Primary Examiner*—David J. Buttner
(74) *Attorney, Agent, or Firm*—Joseph C. Gil; Aron Preis; Gary F. Matz

(57) ABSTRACT

The use of zwitterionic compounds as mold release agents in thermoplastics is disclosed. Molding compositions having good release properties, preferably compositions containing polycarbonate resins are thus disclosed.

3 Claims, No Drawings

USE OF ZWITTERIONIC COMPOUNDS AS MOLD RELEASE AGENTS IN THERMOPLASTICS

FIELD OF THE INVENTION

The present invention is directed to thermoplastic molding compositions and more particularly to compositions having good mold release properties.

SUMMARY OF THE INVENTION

The use of zwitterionic compounds as mold release agents in thermoplastics is disclosed. Molding compositions having good release properties, preferably compositions containing polycarbonate resins are thus disclosed.

BACKGROUND OF THE INVENTION

Patents and publications which disclose the de-molding effect of various additives in thermoplastics in general and polycarbonate in particular are known. The substances used most frequently as mold release agents are the esters of long-chain aliphatic acids and alcohols. The use of esters of fatty acid alcohols or polyols, such as e.g. pentaerythrite, with fatty acids is mentioned by way of example, as disclosed in DE-A 33 12 158, EP-A 100 918, EP-A 103 107, EP-A 561 629, EP-A 352 458, EP-A 436 117, or of esters of Guerbet alcohols in U.S. Pat. No. 5,001,180, DE-A 33 12 157, U.S. Pat. No. 5,744,626 or of montanic acids as acid components in U.S. Pat. No. 4,097,435. A disadvantage is that the fatty acid esters do not have a clear de-molding effect until they are present in quantities of more than 0.5 wt. %. However, these concentrations often produce haze and/or the formation of mold deposits. Siloxanes, also known as mold release agents (cf. U.S. Pat. Nos. 4,536,590, 4,390,651, 3,751,519), are not very compatible with polycarbonate and produce haze in the concentrations required for effectiveness. α-Olefin polymers (EP-A 561 630, EP-A 230 015) with residual double bonds (DE-A 32 44 499) are not color-fast. With hydrogenated systems, as with the long-chain alkanes (U.S. Pat. No. 4,415,696) compatibility with polycarbonate is also a problem and the waxy, often part-liquid, part-wax, consistency of these products is often a hindrance.

Zwitterionic compounds as polymerization catalysts are known from U.S. Pat. No. 4,927,911. However, nothing is said of their suitability as mold release agents.

Furthermore, JP-A 62 109 854 or DE-A 2 409 412 disclose an anti-static effect of zwitterionic compounds, also in combination with other surface-active compounds. However, their potential suitability as mold release agents was not disclosed.

On the basis of the prior art, the object was therefore to find more effective mold release agents, which are effective at low concentrations, do not produce mold deposits and do not result in haze or discoloration in the effective concentrations, and thus to provide a molding composition which may be de-molded easily and which, besides outstanding de-molding properties and transparency, have adequate temperature stability without discoloration or transesterification.

As a result of the demands for shorter cycle times and higher processing temperatures, combined with the increasing complexity of molds, the immediate de-molding of polycarbonate moldings, retaining the very high-quality surface, is also a constant requirement.

DETAILED DESCRIPTION OF THE INVENTION

The object was achieved by the use of amphoteric zwitterionic substances.

The present invention therefore provides the use of amphoteric zwitterionic substances as mold release agents in thermoplastic molding compositions.

The present invention also provides molding compositions containing 90–99.995 wt. % of a thermoplastic
0.005 to 5.0 wt. %, preferably 0.001 to 2.0 wt. %, in particular 0.01 to 1.0 wt. % of a zwitterionic compound.

The molding compositions according to the invention may also contain conventional additives such as e.g. thermal stabilizers, UV stabilizers, other mold release agents, flame retardants, anti-dripping agents, fillers, glass fibers and blend partners such as ABS, SAN, EPDM or polyesters based on terephthalic acid and diols.

The molding compositions according to the invention may be contaminated with impurities contained in the individual constituents of the molding composition as a result of synthesis, processing, working and storage, and contaminants originating from production or processing of the molding compositions according to the invention. However, the aim is to achieve products that are as clean as possible.

The present application also provides moldings containing the molding compositions according to the invention.

Zwitterionic compounds according to the invention are understood to be compounds in general, which carry at least one positive and at least one negative charge on one charge centre each (for example an atom/a group of atoms) within a molecule. The charge centres are therefore linked to each other by covalent bonds.

Compounds of the formula (I):

$$R_1R_2R_3-Y^+-R_4-X^- \qquad (I)$$

are preferred.

Wherein $R_1$, $R_2$, $R_3$ independently denote alkyl-, aryl-, alkaryl-, aralkyl group having 1–30 C atoms, un-substituted, or wholly or partially chlorinated or fluorinated optionally also branched, preferably phenol or un-branched, un-substituted alkyl group having 1–20 C atoms, in particular phenyl, methyl or alkyl having 12–20 C atoms most particularly methyl or phenyl, $R_4$ denotes bivalent alkylene group having 1–30 C atoms, un-substituted or wholly or partially chlorinated or fluorinated and optionally also branched, preferably un-branched, un-substituted α,α-alkylene group $C_1$–$C_5$, Y denotes nitrogen or phosphorus, preferably nitrogen, X denotes $-SO_3^-$, $-COO^-$, $PO_3^-$, preferably $-SO_3^-$.

Sulfobetaines ($X=-SO_3^-$ and $Y=$nitrogen) in which at least one of the groups $R_1$, $R_2$, $R_3$ represents a linear alkyl group with 12 to 20 C atoms, the remaining groups represent methyl groups and $R_4$ represents an alkyl group with 2–5 C atoms, are preferred in particular.

N,N-dimethyl-N-stearyl-N-(3-sulfopropyl)-ammonium-betaine (Ralufone® DS, Raschig AG, Ludwigshafen, Germany) is most preferred.

The zwitterionic substances according to the invention are commercially available and may be purchased from well known sources in the chemicals trade.

Thermoplastics according to the invention are understood to be polymers of ethylenically unsaturated monomers and/ or polycondensates of bifunctional reactive compounds. Mixtures of several plastics are also possible.

Particularly suitable thermoplastics are polycarbonates or copolycarbonates based on diphenols, poly- or copolyacrylates and poly- or copolymethacrylates such as for example and preferably polymethyl-methacrylate, poly- or copolymers containing styrene, such as for example and preferably transparent polystyrene or polystyrene acrylonitrile (SAN), transparent thermoplastic polyurethanes and polyolefins such as for example and preferably transparent polypropylene types or polyolefins based on cyclical olefins (e.g. TOPAS®, Ticona), poly- or copolycondensates of terephthalic acid, such as for example and preferably poly- or copolyethylene terephthalate (PET or CoPET) or glycol-modified PET (PETG).

Thermoplastic, aromatic polycarbonates or copolycarbonates are preferred in particular.

Thermoplastic, aromatic polycarbonates according to the present invention are both homopolycarbonates and copolycarbonates; the polycarbonates may be linear or branched, in the known way.

A part, up to 80 mol %, preferably 20 mol % to 50 mol % of the carbonate groups in the suitable polycarbonates according to the invention may be replaced by aromatic dicarboxylic acid ester groups. Such polycarbonates, which contain, incorporated into the molecule chain, both acid groups of carbonic acid and acid groups of aromatic dicarboxylic acids, are, to be precise, aromatic polyestercarbonates. For the sake of simplicity, they will be subsumed into the generic term thermoplastic, aromatic polycarbonates in this application.

The polycarbonates to be used according to the invention are produced in the known way from diphenols, carbonic acid derivatives, optionally chain stoppers and optionally branching agents, part of the carbonic acid derivatives being replaced by aromatic dicarboxylic acids or derivatives of dicarboxylic acids to produce the polyester carbonates, depending on the carbonate structural units in the aromatic polycarbonates to be replaced by aromatic dicarboxylic acid ester structural units.

The production of polycarbonates has been described in detail in hundreds of patent specifications over the past 40 years. Only Schnell, 'Chemistry and Physics of Polycarbonates', Polymer Reviews, Volume 9, Interscience Publishers, New York, London, Sydney 1964;

D.C. Prevorsek, B. T. Debona and Y. Kesten, Corporate Research Center, Allied Chemical Corporation, Morristown, N.J. 07960: 'Synthesis of Poly(ester Carbonate) Copolymers' in Journal of Polymer Science, Polymer Chemistry Edition, Vol. 19, 75–90 (1980)';

D. Freitag, U. Grigo, P. R. Müller, N. Nouvertne', BAYER AG, 'Polycarbonates' in Encyclopedia of Polymer Science and Engineering, Volume 11, Second Edition, 1988, pages 648–718 and finally Dr. U. Grigo, Dr. K. Kirchner and Dr. P. R- Müller 'Polycarbonates' in Becker/Braun Kunststoff-Handbuch [Plastics Handbook], Vol. 3/1, Polycarbonate, Polyacetale, Polyester, Celluloseester [polycarbonates, polyacetals, polyesters, cellulose esters], Carl Hanser Verlag, Munich, Vienna, 1992, pages 117–299 are referred to here by way of example.

The thermoplastic polycarbonates including the thermoplastic, aromatic polyester carbonates have average molecular weights Mw (determined by measuring the relative viscosity at 25° C. in $CH_2Cl_2$ and at a concentration of 0.5 g per 100 ml $CH_2Cl_2$) of 12 000 to 120 000, preferably 15 000 to 80 000 and in particular 16 000 to 50 000.

Suitable diphenols for the production of the polycarbonates to be used according to the invention are for example hydroquinone, resorcinol, dihydroxydiphenyl, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, ($\alpha,\alpha'$-bis-(hydroxyphenyl)-diisopropyl benzenes and core-alkylated and core-halogenated compounds thereof.

Preferred diphenols are 4,4'-dihydroxydiphenyl, 2,2-bis-(4-hydroxyphenyl)-1-phenyl-propane, 1,1-bis-(4-hydroxyphenyl)-phenyl-ethane, 2,2-bis-(4-hydroxyphenyl)-propane, 2,4-bis-(4-hydroxyphenyl)-2-methylbutane, 1,1-bis-(4-hydroxyphenyl)-m/p diisopropyl benzene, 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxy-phenyl)-m/p-diiso-propyl benzene, 2,2- and 1,1-bis-(4-hydroxyphenyl)-3,3,5-trimethylcyclohexane.

Diphenols preferred in particular are 4,4'-dihydroxydiphenyl, 1,1-bis-(4-hydroxy-phenyl)-phenyl-ethane, 2,2-bis-(4-hydroxyphenyl)-propane, 2,2-bis(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

These and other suitable diphenols are disclosed for example in U.S. Pat. Nos. 3,028,635, 2,999,835, 3,148,172, 2,991,273, 3,271,367, 4,982,014 and 2,999,846, in German unexamined patent applications 1 570 703, 2 063 050, 2 036 052, 2 211 956 and 3 832 396, French patent specification 1 561 518, in the monograph 'H. Schnell, Chemistry and Physics of Polycarbonates, Interscience Publishers, New York, 1964' and in Japanese unexamined patent applications 62039/1986, 62040/1986 and 105550/1986.

With homopolycarbonates, only one diphenol is used, with copolycarbonates, several diphenols are used, the bisphenols used of course being susceptible to contamination from impurities originating from their own synthesis, as with all other chemicals and auxiliary substances added to the synthesis, although it is desirable to work with raw materials that are as pure as possible.

Both monophenols and monocarboxylic acids are suitable chain stoppers. Suitable monophenols are phenol, alkylphenols such as cresols, p-tert. butylphenol, p-n-octylphenol, p-iso-octylphenol, p-n-nonylphenol and p-iso-nonylphenol, halogenated phenols such as p-chlorophenol, 2,4-dichlorophenol, p-bromophenol, cumylphenol and 2,4,6-tribromophenol, or mixtures thereof.

Suitable monocarboxylic acids are benzoic acid, alkylbenzoic acids and halobenzoic acids.

Preferred chain stoppers are the phenols of formula (I)

$$R^6\text{—Ph—OH} \tag{I}$$

wherein $R^6$ represents H or a branched or un-branched $C_1$–$C_{18}$ alkyl group and Ph represents a bivalent aromatic group with 6 to 18 C atoms, preferably phenyls.

The chain stoppers may be used in a quantity of 0.5 mol % to 10 mol %, in relation to mols of diphenols used in each case. Chain stoppers may be added before, during or after phosgenation.

Suitable branching agents are the tri- or more than trifunctional compounds known in polycarbonate chemistry, in particular those with three or more than three phenolic OH groups.

Suitable branching agents are for example phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)phenyl)-orthoterephthalic acid ester, tetra-(4-hydroxyphenyl)-methane, tetra(4-(4-hydroxy-phenyl-isopropyl)-phenoxy)-methane and 1,4-bis[(4',4"-dihydroxy-triphenyl)-methyl]-benzene as well as 2,4-dihydroxy-benzoic acid, trimesic acid, cyanuric chloride and 3,3-bis-(3-methyl-4-hydroxyphenyl)-2-oxo-2,3-dihydroindole.

The branching agents may be used in a quantity of 0.05 mol % to 2.5 mol %, once again in relation to the mols of diphenols used in each case.

The branching agents may either be added with the diphenols and the chain stoppers in the aqueous alkaline phase, or added dissolved in an organic solvent before phosgenation.

All these measures for the production of polycarbonates are known to the person skilled in the art.

Suitable aromatic dicarboxylic acids for the production of the polyester carbonates are for example, phthalic acid, terephthalic acid, isophthalic acid, tert.-butyl isophthalic acid, 3,3'-diphenyl dicarboxylic acid, 4,4'-diphenyl dicarboxylic acid, 4,4-benzophenone dicarboxylic acid, 3,4'-benzophenone dicarboxylic acid, 4,4'-diphenyl-ether dicarboxylic acid, 4,4'-diphenylsulfone dicarboxylic acid, 2,2-bis-(4-carboxyphenyl)-propane, trimethyl-3-phenylindane-4,5'-dicarboxylic acid, or mixtures thereof.

Of the aromatic dicarboxylic acids, the terephthalic acids and/or isophthalic acids are preferred in particular.

Derivatives of dicarboxylic acids are the dicarboxylic acid dihalogenides and the dicarboxylic acid dialkyl esters, in particular the dicarboxylic acid dichlorides and dicarboxylic acid dimethylesters and dicarboxylic acid diphenyl esters.

The carbonate groups are replaced, substantially stoichiometrically and also quantitatively, by the aromatic dicarboxylic acid ester groups, so that the molar ratio of the reaction partners is reproduced in the finished polyester carbonate. The aromatic dicarboxylic acid ester groups may be incorporated both statistically and in blocks.

Preferred production methods for the polycarbonates to be used according to the invention, including polyestercarbonates, are the known interfacial polycondensation process and the known melt transesterification process.

Phosgene is preferably used as the carbonic acid derivative in the former and diphenyl carbonate in the latter. Catalysts, solvents, processing, reaction conditions etc. for polycarbonate production are sufficiently known and disclosed in both cases.

The molding compositions according to the invention may be produced by adding the amphoteric zwitterionic compounds according to the invention to the melt during synthesis or, if using the interfacial polycondensation process, in a processing or concentration step, but also to the solution or melt of the finished thermoplastic. In the solution method, this is done by dissolving the thermoplastic in a suitable solvent, adding the amphoteric zwitterionic compounds according to the invention and optionally, simultaneously or successively, other additives, then evaporating off the solvent and granulating the mixture obtained. In the melt method, this is done by mixing the thermoplastics with the amphoteric zwitterionic compounds according to the invention optionally, either simultaneously or successively, with other additives, either without solvent or in solution and then either melt-compounding the mixtures at temperatures of 260° C. to 360° C. or melt extruding them at temperatures of 250° C. to 320° C., and granulating the mixture obtained.

To obtain improved plastic molding compositions at least one other additive normally present in thermoplastics, preferably poly- and copolycarbonates, may be incorporated, such as e.g. stabilizers (as disclosed e.g. in EP A 0 839 623 A1 or EP A 0 500 496 A1) particularly thermal stabilizers, in particular organically hindered phenols, hindered amines (HALS), phosphites or phosphines, for example and preferably triphenylphosphine, other known mold release agents, for example and preferably fatty acid esters of glycerine or tetramethanol methane, where the unsaturated fatty acids may also be wholly or partially epoxidised, in particular glycerine monostearate (GMS) or pentaerythrite tetrastearate (PETS), flame retardants, antistatic agents, UV absorbers, for example and preferably hydroxy-benzotriazoles and hydroxytriazines, fillers, glass fibers, foaming agents, dyes, pigments, optical brighteners, transesterification catalysts and nucleation agents etc., preferably each in quantities of up to 5 wt. %, preferably 0.01 to 5 wt. % in relation to the whole mixture, in particular 0.01 wt. % to 1 wt. % in relation to the quantity of plastic.

Suitable glass fibers are all commercially available types and grades of glass fiber, i.e. chopped strands and milled fibers, provided they are sized appropriately to make them compatible with polycarbonates.

The glass fibers used to produce the molding compositions are produced from E glass. E glass is an aluminium borosilicate glass with an alkali oxide content of less than 1 wt. % to DIN 1259. Glass fibers 8 to 20 $\mu$m in diameter and 3 to 6 mm long (chopped strands) are normally used. Milled fibers may also be used, as may suitable glass beads.

Flame retardants as may be used e.g. in polycarbonate and also in the molding compositions according to the invention are alkali salts of organic and inorganic acids, in particular sulfonic acids such as for example sodium- or potassium perfluorobutane sulfonate, potassium hexafluoroaluminate, sodium hexafluoroaluminate, potassium diphenylsulfone sulfonate, sodium-2-formyl benzene sulfonate, sodium-(N-benzenesulfonyl)-benzene sulfonamide, often in combination with other flame retardants such as halogenated organic compounds, cryolite and Teflon and also tetrabromobisphenol-oligocarbonate.

These conventional additives may be added to the thermoplastic in the known way together with the components according to the invention or subsequently.

The molding compositions according to the invention may be processed in the conventional processing machinery by known methods using the conventional processing parameters for polycarbonates to produce moldings. The invention therefore also provides the parts produced from the molding compositions according to the invention, such as moldings and semi-finished products.

The moldings are used for example in the electrical, electronic, lighting, computer, construction, automotive and/or aviation industries.

The molding compositions are suitable for injection-molded and extruded articles, such as for example films, sheets, twin-wall sheets, light fittings, data carriers such as Compact Discs and Digital Versatile Discs, housings for electrical equipment, computers, motor vehicle fittings such as discs, instrument panel components, lenses, trim and the like or toys.

EXAMPLES

The quantities given in the examples, expressed in wt. %, relate to the weight of the whole mixture.

Polycarbonate 1:

An additive-free aromatic polycarbonate consisting of 2,2-bis-(4-hydroxyphenyl)-propane with phenol terminal groups with a solution viscosity of 1.28. It is melted at 290° C. in a twin-shaft extruder (ZSK 32/2). The polymer strand was cooled and granulated.

Polycarbonate 2:

An additive-free aromatic polycarbonate consisting of 2,2-bis-(4-hydroxyphenyl)-propane with tert.-butyl phenol terminal groups with a solution viscosity of 1.195. It is melted at 280° C. in a twin-shaft extruder (ZSK 32/2). The polymer strand was cooled and granulated.

The granules were dried in a vacuum shelf dryer at 80° C. for 24 h and injection molded in an injection-molding machine at 310° C. and at a mold wall-temperature of 110° C., to produce disc-shaped test pieces.

The friction coefficients were measured using a specially made measuring tool. The same disc-shaped moldings were produced in all tests in an Arburg Allrounder 320-210-850-D injection molding machine, at a composition temperature of 300° C. and a molding temperature of 90° C. After cooling for 20 seconds, the molding is twisted through an angle of 90° C. in the closed mold. A processing data collection system measures the breakaway torque of the disc and the contact pressure of the mold plunger on the disc. The coefficients are determined from these measuring parameters.

The coefficient of static and dynamic friction is used as a measure of the de-molding effect. Lower values are therefore more advantageous than high values.

Examples 1 to 4 and reference examples 1 to 5 are shown in Table 1. A polycarbonate containing no mold release agent, a product containing GMS=glycerine monostearate (Loxiol EP 129, Henkel KGaA, Düsseldorf, Germany) and a product containing PETS=pentaerythrite tetrastearate (Loxiol VPG 861, Henkel KGaA) were given for reference.

The molding compositions according to the invention are characterised by much lower friction coefficients and are more effective even in small quantities than the standard GMS and PETS mold release agents normally used.

TABLE 1

| | Composition | Friction coefficient - Static | Friction coefficient - Dynamic |
|---|---|---|---|
| Example | | | |
| 1 | Polycarbonate 1 + 0.2 wt. % N,N-di-methyl-N-stearyl-N-(3-sulfopropyl)-ammonium-betain (Ralufon ®DS, Raschig AG, Ludwigshafen, Germany) | 0.28 | 0.28 |

TABLE 1-continued

| | Composition | Friction coefficient - Static | Friction coefficient - Dynamic |
|---|---|---|---|
| 2 | Polycarbonate 2 + 0.075 wt. % N,N-dimethyl-N-stearyl-N-(3-sulfopropyl)-ammonium-betain | 0.43 | 0.45 |
| 3 | Polycarbonate 2 + 0.05 wt. % N,N-dimethyl-N-stearyl-N-(3-sulfopropyl)-ammonium-betain | 0.48 | 0.5 |
| 4 | Polycarbonate 2 + 0.025 wt. % N,N-di-methyl-N-stearyl-N-(3-sulfopropyl)-ammonium-betain | 0.57 | 0.57 |
| Ref. Examples | | | |
| 1 | Polycarbonate 2 + 0.075 wt. % GMS | 0.6 | 0.61 |
| 2 | Polycarbonate 2 + 0.05 wt. % GMS | 0.69 | 0.69 |
| 3 | Polycarbonate 2 + 0.025 wt. % GMS | 0.86 | 0.85 |
| 4 | Polycarbonate 1 + 0.5 wt. % PETS | 0.34 | 0.38 |
| 5 | Polycarbonate 1 | 1.06 | 0.85 |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising a thermoplastic polycarbonate resin and a mold releasing amount of a Zwitterionic compound according to formula (I)

$$R_1R_2R_3\text{—}N^+\text{—}R_4\text{—}SO_3^- \tag{I}$$

wherein $R_1, R_2$, and $R_3$ independently denote alkyl groups having 1–30 carbon atoms, with the proviso that at least one group of $R_1, R_2$, and $R_3$ denotes an alkyl group having 12 to 20 carbon atoms, and $R_4$ denotes a bivalent alkylene group having 1–30 carbon atoms.

2. A molded article comprising the composition of claim 1.

3. The molding composition of claim 1 wherein the amount is 0.005 to 50% relative to the weight of the composition.

* * * * *